United States Patent [19]

Miyahara et al.

[11] Patent Number: 4,671,654
[45] Date of Patent: Jun. 9, 1987

[54] AUTOMATIC SURVEYING APPARATUS USING A LASER BEAM

[75] Inventors: Kenji Miyahara; Hisashi Sakiyama, both of Ichikawa, Japan

[73] Assignee: Mac Co., Ltd., Chiba, Japan

[21] Appl. No.: 612,560

[22] Filed: May 21, 1984

[30] Foreign Application Priority Data

May 21, 1983 [JP] Japan .................................. 58-89542
May 21, 1983 [JP] Japan .................................. 58-89543

[51] Int. Cl.$^4$ ............................................. G01B 11/26
[52] U.S. Cl. .................................... 356/152; 356/154; 358/107
[58] Field of Search ................. 356/152, 154; 358/107

[56] References Cited

U.S. PATENT DOCUMENTS

| | | | |
|---|---|---|---|
| 3,494,699 | 2/1970 | Gloge | 356/152 |
| 3,680,958 | 8/1972 | Von Bose | 356/141 |
| 3,706,493 | 12/1972 | Redmann | 356/152 |
| 3,799,674 | 3/1974 | Guillet et al. | 356/152 |
| 3,865,491 | 2/1975 | Hogan | 356/141 |

Primary Examiner—Stephen C. Buczinski
Attorney, Agent, or Firm—Wenderoth, Lind & Ponack

[57] ABSTRACT

An automatic surveying apparatus for surveying a route in tunneling work, for example, by directing a laser beam from a laser device onto a screen of a moving target to form a laser spot on the screen and detecting the positional coordinates of the laser spot on the screen by means of an image pick-up camera to obtain the positional deviation of the target with high accuracy. The angular deflections of the target can also be measured by use of a target composed of two screens and two image pick-up cameras.

5 Claims, 10 Drawing Figures

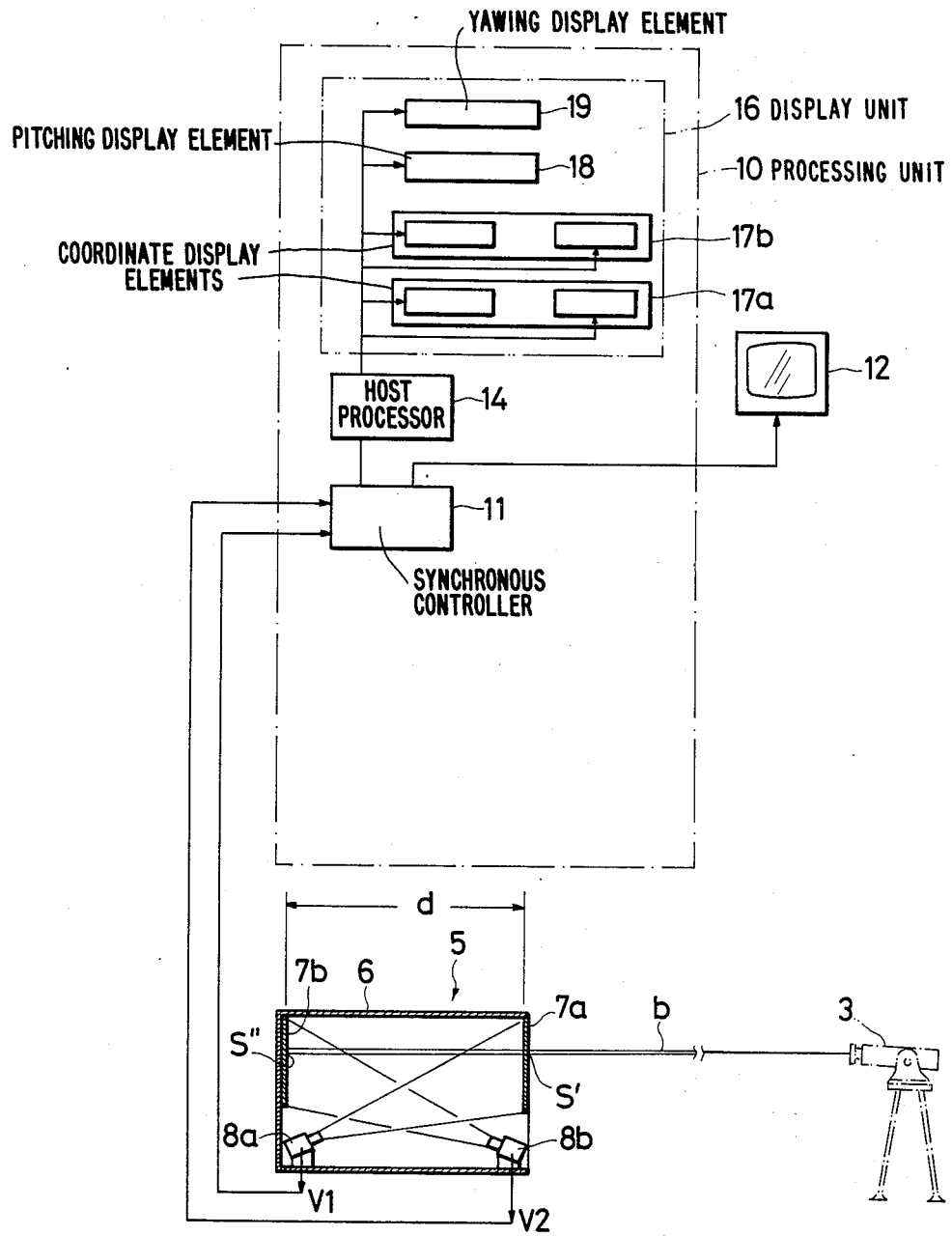

AUTOMATIC SURVEYING APPARATUS USING A LASER BEAM

BACKGROUND OF THE INVENTION

1. Field of the Invention

This invention relates to an automatic surveying apparatus using a laser beam for making a route survey in road building, tunneling work and so on with great accuracy.

2. Description of the Prior Art

A survey for measuring long distances is indispensable for the fieldwork in constracting a road, pipe arrangement and so on or tunneling work. Compared with the fieldwork as described, the tunneling work which is restricted by space and requires high accuracy of the measurement adopts neither a method of traverse survey nor a method of triangulation.

In recent years, laser measuring apparatuses have been extensively adopted in the field of surveying. Of conventional measuring apparatuses to be applied to the shield method for excavating a tunnel while advancing a short cylinder (shield machine), there have been proposed various position-measuring apparatuses in which positional measurement is accomplished by directing a laser beam from a laser device located at the entrance of the tunnel onto a target fixed on the shield machine or an excavator located at the pit face of the tunnel, and detecting a laser spot formed on the target by the laser beam to obtain the positional deviation of the target which is caused by the movement of the shield machine. In the conventional measuring apparatuses, a projection screen on which a laser beam is projected to make a spot is mechanically moved in the direction perpendicular to the optical axis of the laser beam by the amount of positional displacement of the laser spot on the screen under observation using an image pick-up camera, thereby to detect the positional deviation of the target relative to the datum point for surveying. This method inevitably leads to mechanical errors, thereby involving decrease in measuring accuracy. In addition, the measuring accuracy may be further decreased due to the optical aberration of lenses used in the apparatus.

There has been proposed another apparatus in which the positional deviation of a laser spot which is formed on the projection screen by directing a laser beam thereon is detected by use of a solid-state image pick-up camera such as a CCD camera (Japanese Patent Application Disclosure Sho. No. 57(1982)-96213). This apparatus involves mechanical errors in measurement similarly to the foregoing prior art apparatus and requires rare technical skill when a survey is accomplished.

One of the inventiors of this invention previously proposed a position measuring apparatus disclosed in Japanese Patent Application Disclosure Sho. No. 56(1981)-104209, which enjoys high accuracy of measurement and is easy to handle.

The conventional measuring apparatuses including the apparatus proposed earlier by one of the inventors are disadvantageous in that they call for the work of surveying which proves to be troublesome when a survey of a sharply curved route is accomplished, because turning work for moving the laser device to a subsequent reference point for surveying consumes much time and labor. Besides, the conventional apparatuses entail decrease in measuring accuracy and can detect only positional deviation relative to the datum point at which the laser device is located, but cannot measure angular deflections (pitching and yawing) of the moving target relative to the optical axis of the laser beam issued from the laser device.

SUMMARY OF THE INVENTION

This invention was made to overcome the problems of prior arts described above and aims to provide an automatic surveying apparatus using a laser beam, which is easy to handle, capable of automatically effecting a survey of a route having curved or bent portions with remarkable accuracy and accurate measurements of the positional deviation and angular deflections of a moving target relative to the datum point at a real time and has a construction which is free from mechanical errors.

To accomplish the object described above according to this invention, there is provided an automatic surveying apparatus which comprises a laser device for emitting a laser beem and a moving target composed of at least one projection screen on which the laser beam from the laser device impinges to form a laser spot and an optical processing system composed of, for example, at least one image pick-up camera for detecting the position coordinates of the laser spot on the screen.

The laser device is installed at the datum point, and the moving target is moved along a design reference line for surveying. The distance between the laser device and the moving target may be simultaneously measured, as occasion demands, by use of an optical distance-measuring device. The positional deviation and angular deflections of the target relative to the laser device can be measured by taking the laser spot on the projection screen by the image pick-up camera as an optical processing system and obtaining the position coordinates of the laser spot on the screen by an arithmetic operation. If the moving target comprising two projection screens and two image pick-up cameras is used, the measurement of the angular deflections of the target can be readily fulfilled with great accuracy.

The other objects and characteristics of the present invention will become apparent from the further disclosure of the invention to be made hereinafter with reference to the accompanying drawing.

BRIEF EXPLANATION OF THE DRAWINGS

FIG. 4 is a schematic diagram illustrating another embodiment of the apparatus according to this invention.

DESCRIPTION OF THE PREFERRED EMBODIMENTS

Figure 1:
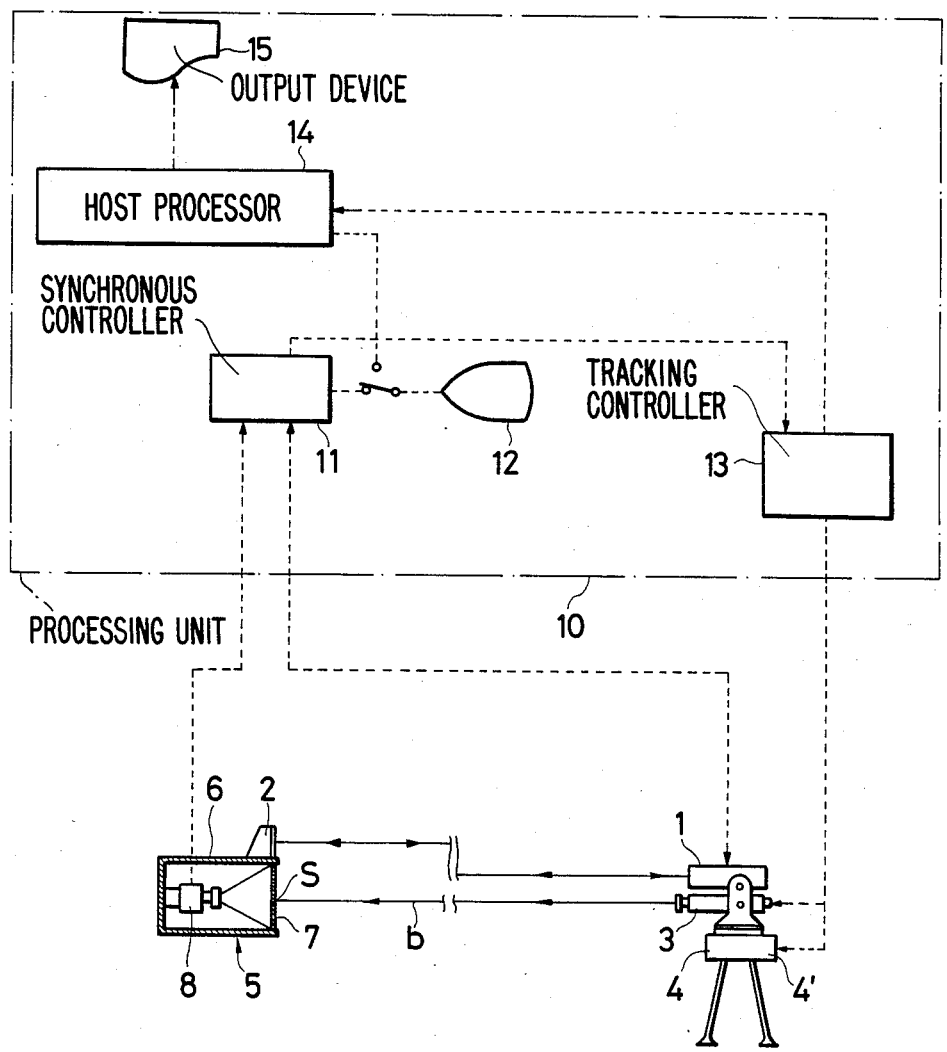
FIG. 1 is a schematic diagram illustrating one preferred embodiment of the automatic surveying apparatus according to this invention.

In FIG. 1, there is illustrated one preferred embodiment of the automatic surveying apparatus according to the invention.

In the drawing, 1 denotes an optical distance-measuring device which is mounted on a laser device 3 and serves to direct infrared rays or a laser beam onto a reflective target 2. The reflective target 2 is mounted on a moving target 5 which is moved along a design reference line on a route to be surveyed. Both the distance-measuring device 1 and the laser device 3 are fixed on, for example, a tripod 4 having a universal head, so that light rays or beams emitted therefrom are radiated in the same direction. By 4' is denoted a tracking device which is adapted to drive the tripod 4 so as to direct the distance-measuring device 1 and the laser device 3 toward the respective targets 2 and 5.

The moving target 5 is comprises a housing 6 provided with a projection screen 7 upon which the laser beam b radiated from the laser 3 impinges to form a laser spot S and an optical processing system composed of, for example, an image pick-up camera or image sensor 8 such as a CCD camera which serves to take the laser spot formed on the projection screen 7.

Though the reflective target 2 is disposed on the housing 6 of the moving target 5, it may be fixed directly on a tunneling shield machine, or instead, a reflective means may be attached to a part of the projection screen 7.

The optical distance-measuring device 1 is not necessarily used if the distance between the laser device 3 and the moving target 5 can be measured with accuracy by use of a suitable means.

Denoted by 10 is a processing unit. In this embodiment, the processing unit comprises a synchronous controller 11, a monitor 12 such as a CRT for displaying the image of the laser spot taken by the image pick-up camera 8, a tracking controller 13 for controlling and driving the tracking device 4' to adjust the direction in which the beams are radiated from the laser device 3 and distance-measuring device 1, a host processer 14, and an output device 15 such as a printer. The aforementioned synchronous controller 11 serves to subject the video signals from the camera 8 to sampling process to detect the position of the laser spot S on the projection screen 7, which is represented by the abscissa (X-distance) and ordinate (Y-distance) on the screen. The signal in relation with the distance between the laser device 3 and the moving traget 5 is fed from the distance-measuring device 1 to the monitor 12 to display the distance informations. The tracking controller 13 serves to observe the X-Y coordinate data of the laser spot and the signals representing the distance information and, if necessary, adjust the direction in which the laser beam is radiated so as to prevent the laser spot on the screen from being out of place. When the laser device 3 is reoriented by the action of the tracking controller 13 to adjust the direction thereof, data representing the values $\Delta X$ and $\Delta Y$ of deviation of the target 5 in the X-Y directions in addition to data of the distance between the laser device and the moving target are fed from the synchronous controller 11 to the host processer 14.

The deviation of the target from the design reference line in tunneling work is measured by subjecting the aforementioned data to arithemetic operation in the host processer 14 in consideration of data given by the tracking controller 13. The output data of the host processer 14 are given to the printer 15 or CRT 12.

Prior to route survey by use of the apparatus having the structure so far described, a design reference line which is predetermined on the route to be surveyed is previously inputted to the host processer 14. In this case, an auxiliary memory device using a magnetic tape, magnetic flexible disk or the like may be used.

Figure 2:
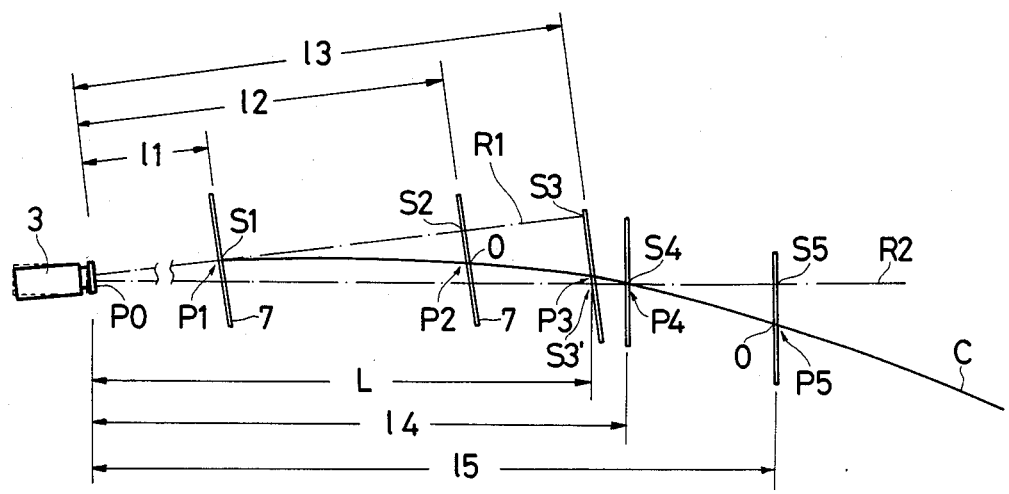
FIG. 2 is a schematic diagram illustrating the operating principle of the apparatus of FIG. 1.
Figure 3A:
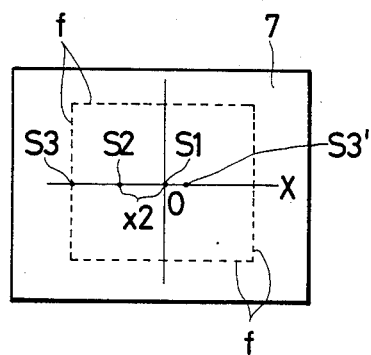
FIGS. 3A and 3B are explanatory diagrams illustrating the positional displacement of the laser spot on the projection screen.
Figure 3B:
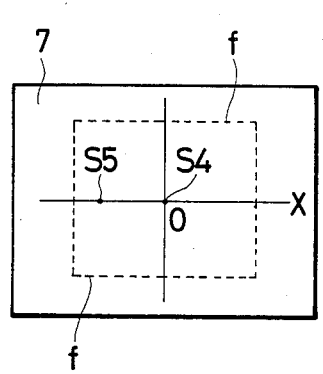

Now, the method for carrying out route survey in tunneling with the aforementioned serveying apparatus will be described with reference to FIG. 2. First, both the laser device 3 and the distance-measuring device 1 are set at the datum point Po on tangent line R1 of the design line C. The target 5 is put in position in such a state that its center is conformed to the starting point P1 on the design reference line. Simultaneously, the laser spot S should be positioned at the center O of the X-coordinate axis on the screen 7 of the target 5 as illustrated in FIG. 3A. At the same time, the light rays issued from the distance-measuring device 1 impinges upon the reflective target 2 and returns to the device 1, thereby to detect the distance l1 at a real time. The target 5 is moved forward along the design line with the construction work being progressing. The design reference line may contain curved portions. When the screen 7 reaches the point P2 at a distance from the laser device 3 by the length l2, the laser spot which has been placed at the origin O at first moves from the point S1 to the point S2 separated from S1 by the length l2. The position of the spot S2 is observed by the camera 8 and represented by the X-Y coordinate values in the synchronous controller 11, and further, the coordinate values are fed to both the tracking controller 13 and the host processer 14. With the host processer 14, the design value corresponding to the data of the distance l2 fed from the distance-measuring device 1 is compared with the measured value X2. If there is difference between the design value and the measured value, the direction and amount of the deviation of the spot relative to the design position on the screen 7 are displayed on the CRT 12 and given to the printer 15 to print out the data. The measurement as described can be made at any point on the line C and therefore, the deviations of the traget relative to the route may be continuously detected.

When the laser spot reaches the measuring limit of the screen 7 as a result of further moving the target along a curved line, the laser device 3 may be relocated fore to a newly determined bace position (turning point) to repeatedly carry out the preceeding steps. A method for relocation of the laser device 3 will be described below.

The screen 7 is provided with a limit of measurement. The tracking controller 13 is operated, when the laser spot reaches a boundary f of the limit of measurement on the screen, to allow the tracking device 4' mounted on the tripod 4 to be drive until the spot returns to the origin O on the screen 7 as illustrated in FIG. 2. In FIG. 2, R1 designates a tangent line which touches the design line C at a starting point for measurement, and R2 designates the laser beam radiated from the reoriented laser device.

Assuming that the laser device turns from R1 to R2 to form a spot S3' on the screen, the synchronous controller 10 issues X-Y coordinate data of the point S3'. The tracking device 12 receives the X-Y coordinate from the processing unit 10 to the calculation on the data of S3 and S3' and consequently to obtain the vectors ΔX and ΔY from S3' to S3. The vectors thus obtained are stored in the memory device and simultaneously forwarded to the host processer 14 together with the distance data L of the target relative to the laser device. Then, the host processer 14 performs calculation on the basis of data X, Y, ΔX, ΔY and L given by the tracking controller 13 to find the displacement of the target 5 from the line R1. As a result, the progress rate of the construction work can be comprehended by successively comparing the result of measurement with the data of the design line previously inputted in the host processer. Generally, it is very difficult to adjust the direction of the laser device with high accuracy on the basis of an angle. However, in this embodiment, the direction of the laser device is adjusted on the basis of the positional displacement of the laser spot on the projection screen 7, thereby to enable the adjustment of the direction of the laser device to be readily fulfilled with great accuracy irrespective of the distance L between the laser device and the moving target.

Otherwise, the laser spot S dose not necessarily return to the origin O on the screen 7 when the spot reaches the limit of measurement on the screen. If the direction in which the target moves can be foreseen, it is desirable to relocate the spot so that reorienting of the laser device is carried out as few as possible.

In the same manner as above, subsequent surveying of the route C can be automatically carried out with high accuracy without requiring a highly skilled technique. Likewise, measurement with respect to the Y-coordinate axis of the target can be carried out.

In the preferred embodiment so far described, only the position of the target relative to the datum point at which the laser device is set in position can be measured. As well, it is possible to angular deflections such as pitching and yawing phenomena of the target relative to the axis of a laser beam radiated from a laser device. The surveying apparatus which can fulfill measurement of not only positional deviation but angular deflections of the target will be described hereinafter.

Figure 5:
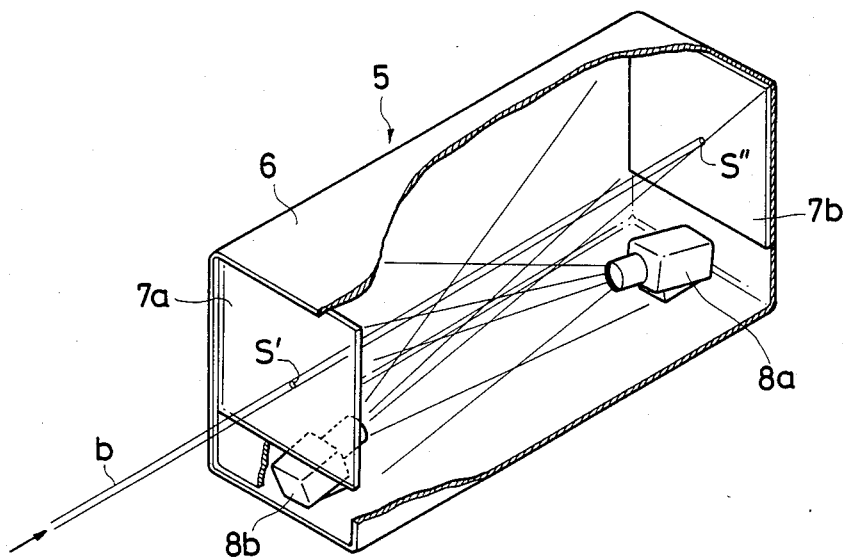
FIG. 5 is a perspective view, partly in cross section, of the moving target of FIG. 4.

FIGS. 4 and 5 represent another embodiment of this invention. In the drawings, the component denoted by the same symbols as those of the foregoing embodiment are equivalent thereto.

In this embodiment, the target 5 comprises a first projection screen 7a which is made of a semitransparent and disposed on the beam incident side of the housing 6, a second projection screen 7b disposed at a fixed distance from and in paralled to the first projection screen 7a, and an optical processing system composed of first and second image pick-up cameras 8a and 8b which take the respective laser spots S1 and S2 formed on the screens 7a and 7b. The first camera 8a is installed under the screen 7b and the second camera 8b is installed under the screen 7a in such a state that their shot directions intersect each other so as not to come into the fields of vision of the opposite cameras. Further, the cameras 8a and 8b is desired to set their shot angles as little as possible in order to reduce the parallaxs thereof. Namely, it is desirable to bring the cameras 8a and 8b close to the corresponding overhead screens 7b and 7a and enlarge the distance d between the screens so far as a restriction in space permits.

In this embodiment, CCD image sensors which are small in size and enjoy stable operation and high resolving power is used as the cameras 8a and 8b. As is evident from the effects aimed at by the present invention, the image pick-up cameras in this embodiment are only required to have functions of taking the laser spots S1 and S2 on the screens 7a and 7b and outputting video signals V1 and V2 representing the coordinate values of the spots. Therefore, the image pick-up camera may of course be of any type, but not necessarily of a CCD camera.

The processing unit 10 in this embodiment comprises a synchronous controller 11, a host processer 14 and a display unit 16 for displaying output date from the host processer 14. A mointor 12 serves to reproduce the images taken by the cameras 8a and 8b so as to enable the laser spots on the screens 7a and 7b to be observed and the cameras to be adjusted remotely.

The display unit 16 is composed of a pair of coordinate displaying elements 17a and 17b for displaying the X-Y coordinate values of the laser spots on the respective screens 7a and 7b, a pitching displaying element 18 for vertical-angle deflection (pitching phenomenon) of the moving target, and a yawing display element 19 for horizontal-angle deflection (yawing phenomenon) of the moving target. These display elements may be constituted by a plurality of light-emitting diodes or liquid crystal elements, for example.

Figure 6:
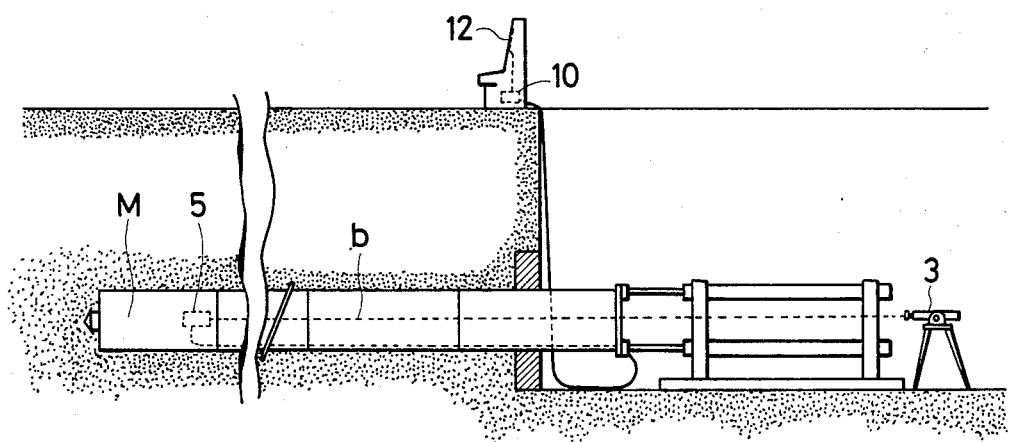
FIG. 6 is a schematic explanatory diagram of tunneling work to which the apparatus according to this invention is applied.

The principle of operation which permits effective application of the surveying apparatus of the present invention to route survey in tunneling work will be described conceptually by reference to FIG. 6. A laser beam b from the laser device 3 set in position outside the tunnel is directed onto the first projection screen 7a of the target 5 installed on a tunneling shield machine M. For example, at a design reference point on the route, the target is so arranged that laser beam b impinges upon the center of the screen 7a. While driving forward the shield machine M in the tunnel, the laser spot S1 on the screen 7a is observed by the first camera 8a to detect the displacememt thereof relative to the center of the screen. If the shield machine M moves forward in parallel to axis of the laser beam b, no displacement of the spot S1 appears. However, if the shield machine is out of place, the laser spot S1 deviates from the center of the screen 7a. The amount and direction of the displacement between the center of the screen 7a and the laser spot S1 can be found by the camera 8a in terms of X-Y coordinate values. The camera 8a issues vides signal V1 representing the X-Y coordinate values to the host processer 14 through the synchronous controller 11 of the processing unit 10, thereby to generate infomation signals to be given to the display element 17a.

At the time, the laser beam b impinges upon the second projection screen 7b of the target through the semitransparent first screen 7a. The laser spot S2 thus formed on the screen 7b is likewise observed by the second camera 8b and the video signal V2 representing the displacement of the spot S2 from the center of the screen 7b is fed from the camera 8b to the display element 17b through the synchronous controller 11 and a host processer 14 of the processing unit 10. The display element 17b indicates the displacement of the spot S2 in the form of X-Y coordinate values.

Figure 7:
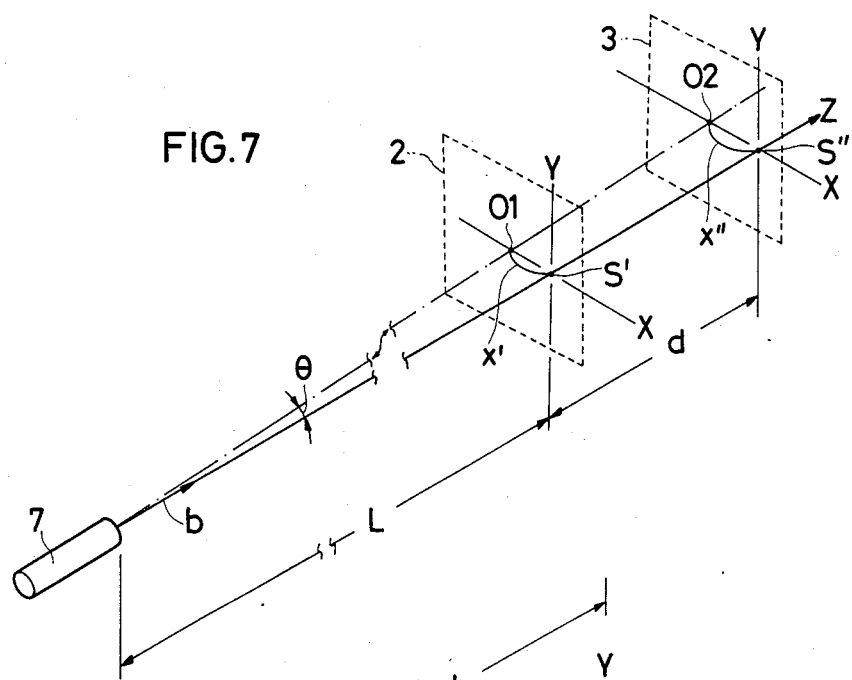
FIG. 7 is an explanatory diagram illustrating the analyzing principle of the positional measurement according to this invention.

Now, when the target 5 is tilted at an angle to the optical axis of the laser beam b to manifest the angular deflections, the positions of the laser spots S1 and S2 formed on the first and second screens 7a and 7b become irregularly different in vector from each other relative to the respective centers of the screens. For example, if the shield machine M make a straight advance in a deviated direction from the design reference line, the lengthwise axis of the target 5 is directed toward the laser device 3 as illustrated in FIG. 7.

The displacements x1 and x2 of the respective laser spots S1 and S2 from the origins O1 and O2 are expressed as a angular deflection tan $\theta$ in accordance with the following formula.

$$\tan \theta = \frac{X1}{L} = \frac{X2}{L + l} \quad (1)$$

The relationship on the formula can be applied to the deflection of the target in the Y-axis direction and the displacement thereof expressed in terms of X-Y coordinates.

Figure 8A:
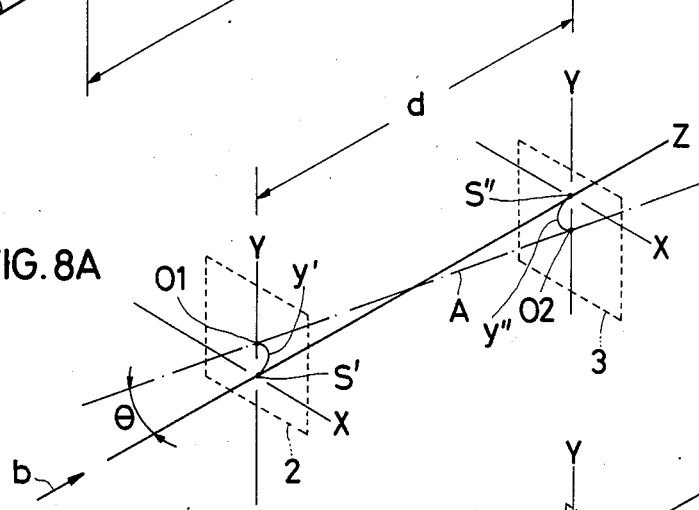
FIGS. 8A and 8B are explanatory diagrams illustrating the analyzing principle of the measurement of angular deflections according to this invention.
Figure 8B:
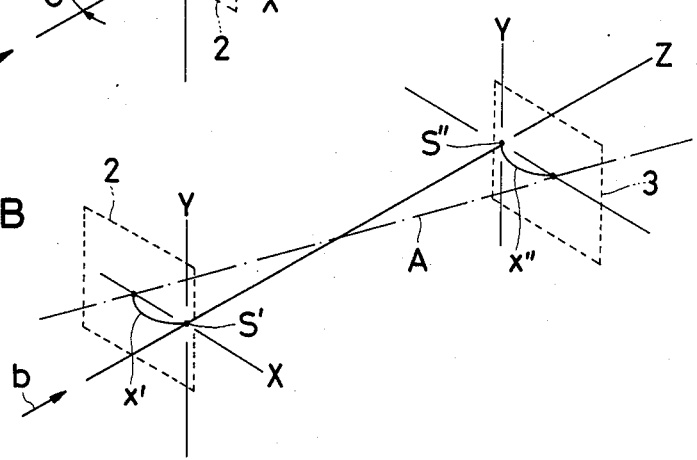

In a case where the deflection vectors which can be expressed in the form of X-Y coordinates are irregular as illustrated in FIGS. 8A and 8B, it will be understood to give rise to an angular deflection of the target.

In FIG. 8A, the laser spots S1 and S2 on the screens 7a and 7b are respectively deviated from the origins O1 and O2 by the distances y1 and y2 in the positive and negative directions. This is a typical example of vertical-angle deflections (pitching phenomenon). In this case, the inclination of the axis A of the target 5 relative to the laser beam b is expressed as follows.

$$\tan \theta 1 = \frac{y1 - y2}{l} \quad (2)$$

In FIG. 8B, as is understood from the laser spots S1 and S2 at distances x1 and x2 from the origins O1 and O2 on the respective screens 7a and 7b, the axis A of the target 5 is inclined to give rise to a horizontal angle deflection (yawing phenomenon). The inclination of the target axis A is expressed as follows.

$$\tan \theta 2 = \frac{x1 - x2}{l} \quad (3)$$

Every angular inclinations of the target which are represented as composition of the vertical angle deflection and the horizontal angle deflection can be confirmed by the aforementioned tan $\theta$1 and tan $\theta$2.

Furthermore, when the shield machine M brings about a rolling phenomenon, the accuracy of the measurement can be substantiated by making adjustment for the result of the operation according to the aforementioned formulas using inclination data obtained by an inclinometer which has been used conventionally in the art. The inclinometer is not an element of this invention and therefore, the description thereof is omitted.

The respective values representing the angular inclinations expressed by the vertical and horizontal angle deflections are displayed on the display elements 15 and 17.

As described above, the present invention permits the positional deviation and angular deflections of a moving target to be automatically measured with high accuracy on a real time basis and provides an automatic surveying apparatus which is easy to handle and capable of effecting accurate route survey without involving mechanical errors.

What is claim is:

1. An automatic surveying apparatus using a laser beam, comprising a laser device adapted to radiate a laser beam and installed at a datum point for surveying, and a moving target having at least one projection screen upon which the laser beam from said laser device forms a laser spot and an optical processing system adapted to take the laser spot formed on said projection screen and to detect the positional coordinates of the laser spot on the projection screen, whereby a positional deviation of the target relative to the laser device is automatically measured on the basis of the positional coordinates detected by the optical processing system.

2. An automatic surveying apparatus as set forth in claim 1, wherein the optical processing system includes at least one image pick-up camera.

3. An automatic surveying apparatus as set forth in claim 1, further comprising an optical distance-measuring device which is mounted on the laser device for projecting a light beam onto a reflective target attached to the moving target so as to measure the distance between said laser device and said moving target.

4. An automatic surveying apparatus as set forth in claim 3, further comprising a processing unit adapted to detect the displacement of the laser spot in terms of X-Y coordinates relative to the origin on the projection screen and issue control signals, and a tracking device adapted to drive the laser device in response to the control signals from said processing unit with movement of the moving target.

5. An automatic surveying apparatus using a laser beam, comprising a laser device adapted to radiate a laser beam and installed at a datum point for surveying, and a moving target having at least one projection screen upon which the laser beam from said laser device forms a laser spot and an optical processing system adapted to take the laser spot formed on said projection screen and to detect the positional coordinates of the laser spot on the projection screen, whereby a positional deviation of the target relative to the laser device is automatically measured on the basis of the positional coordinates detected by the optical processing system;
   wherein the moving target comprises two projection screens disposed at a fixed distance and in parallel to each other and the optical processing system comprises two image pick-up cameras for taking the laser spots which are formed on the respective projection screens by directing the laser beam from the laser device onto the screens, whereby the positional deviation and angular deflections of said moving target relative to said laser device are measured.

* * * * *